June 17, 1969  W. C. O'NEILL III  3,449,957
APPARATUS FOR MEASURING ABSOLUTE PRESSURE
Filed Sept. 29, 1965

INVENTOR
WILLIAM C. O'NEILL, III

BY Hurvitz + Rose

ATTORNEYS

United States Patent Office 3,449,957
Patented June 17, 1969

3,449,957
APPARATUS FOR MEASURING ABSOLUTE
PRESSURE
William C. O'Neill III, Washington, D.C., assignor to
Bowles Engineering Corporation, Silver Spring, Md.,
a corporation of Maryland
Filed Sept. 29, 1965, Ser. No. 491,238
Int. Cl. G01l 7/00
U.S. Cl. 73—388                              8 Claims

ABSTRACT OF THE DISCLOSURE

A pressure measuring device in the form of a continuous flow channel has an inlet communicating with a venturi formed downstream thereof. The channel has a nozzle formed therein downstream of the venturi and may include an aspirator at the outlet thereof to maintain the fluid flow through the nozzle at sonic velocity. Openings are provided in a sidewall of the channel at the inlet and the throat of the venturi whereby a measurement of the static pressure may be effected.

Figure 1:
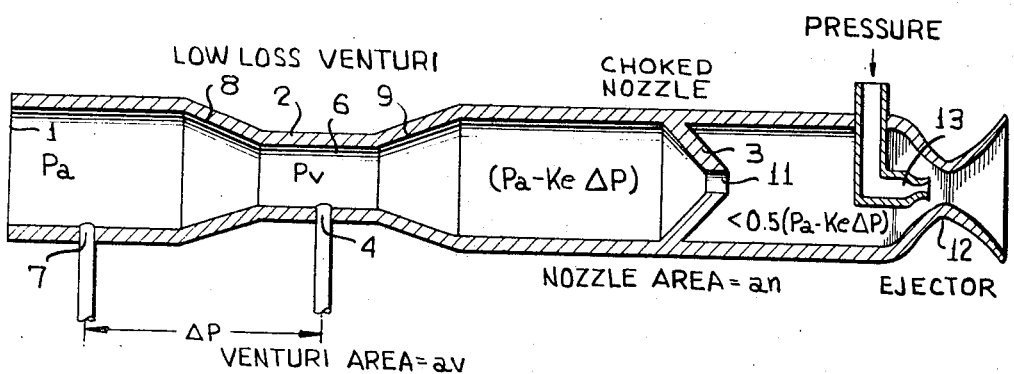

The present invention relates to measuring devices and, more particularly, an apparatus for measuring absolute pressure.

Numerous devices are available for measuring absolute pressure, but normally these devices are absolute temperature dependent and do not provide an output function that is linear with the absolute pressure to be measured. Devices which are relatively independent of absolue temperature and which do provide a linear relationship between the measured quantity and the absolute pressure are available, but they are normally quite sophisticated in concept and complex in construction.

In accordance with the present invention, there is provided a device for measuring absolute pressure which is substantially independent of temperature, provides an output function which is linear with absolute pressure and which is unusually simple in construction. The apparatus comprises a relatively low-loss venturi, a nozzle connected in series with and downstream of the venturi and ports for measuring the differential in pressure between the input and throat of the venturi. Further, provision must be made to operate the nozzle in the choked condition; that is, the condition in which the velocity of the fluid flowing through the nozzle is sonic. Under these conditions of operation, the apparatus is independent of absolute temperature except for very low order effects and the absolute pressure is a linear function of the differential in pressure measured as indicated above. With this specific combination, direct dependence on absolute temperature is eliminated and, in those instances where certain coefficients of the nozzle and venturi are effected by absolute temperature, the coefficients appear as ratios. The particular coefficients are in themselves relatively insensitive to absolute temperature and, in addition, the coefficients have a similar dependence on temperature so that the residual dependence of these ratios on absolute temperature is negligible. The overall effect of the arrangement is to provide an absolute pressure measuring device which is amazingly free from temperature effects and one in which the relationship between the measured quantity and absolute pressure is unusually linear.

Another feature of the apparatus in the invention is that the range of a single unit is substantially indefinite having been tested from pressures of 3 p.s.i.a. to 115 p.s.i.a. The linearity and lack of temperature effects described above held over this entire range.

The pressure measuring device of the invention may be employed as a barometer or altimeter or for any of the usual absolute pressure measuring functions. Further, the apparatus may be made as a three-dimensional device, or conversely, as a two-dimensional device having a constant depth. In consequence of this latter feature, the apparatus is completely compatible with the new art of pure fluid systems since the device may be formed as channels in a flat plate. Conventional pure fluid techniques may be employed for measuring the differential in pressure provided by the apparatus so that the entire system is not only structurally compatible with integrated pure fluid circuits but is functionally compatible therewith.

It is an object of the present invention to provide an absolute pressure gauge which is substantially temperature insensitive and which provides a linear function between the measured quantity of the gauge and absolute pressure.

It is another object of the present invention to provide an absolute pressure gauge operable over a very wide range of absolute pressures.

Still another object of the present invention is to provide an absolute pressure gauge which is compatible with the new art of pure fluid systems, both structurally and functionally.

Figure 2:
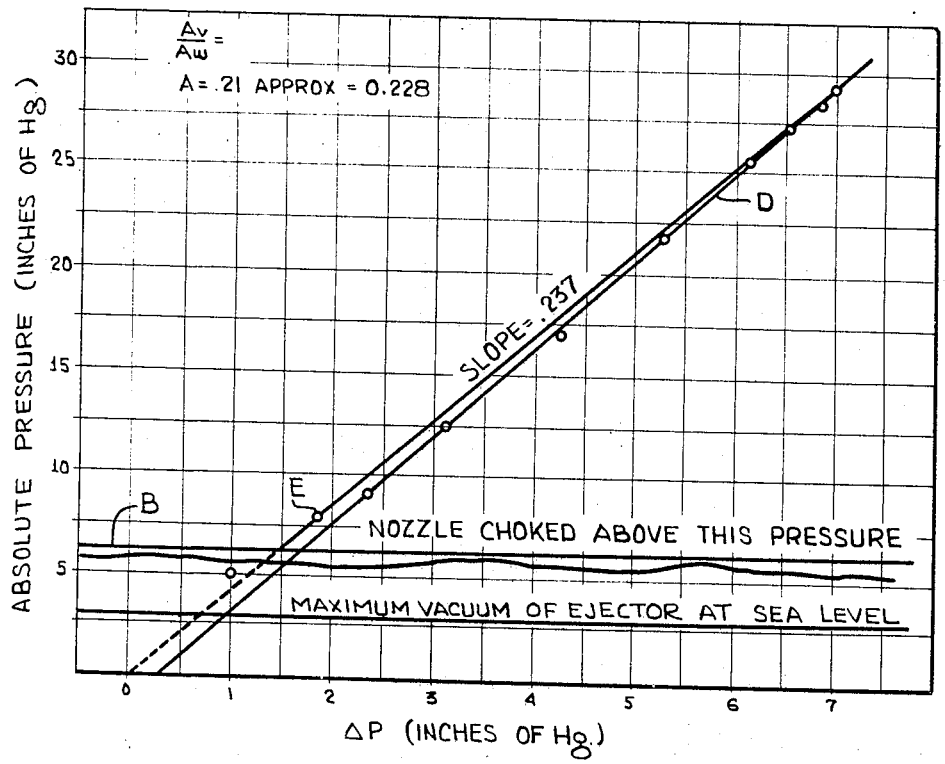

The above and still further objects, features and advantages of the present invention will become apparent upon consideration of the following detailed description of one specific embodiment thereof, especially when taken in conjunction with the accompanying drawings, wherein:

FIGURE 1 is a cross-sectional view of the apparatus of the present invention; and FIGURE 2 is a graph of test data wherein absolute pressure is plotted as a function of the differential pressure measurement provided by the apparatus of the present invention.

Referring specifically to FIGURE 1 of the accompanying drawings, there is illustrated an apparatus constructed in accordance with one embodiment of the present invention. The apparatus comprises a passage having an ingress orifice 1, a venturi generally designated by the reference numeral 2 formed downstream thereof, and a nozzle 3 formed downstream of the venturi 2. The structure may have a circular cross-section or may comprise a channel of constant depth and a width that varies in accordance with the plan view of the figure.

A small opening 4 is formed in a sidewall of the channel at a throat 6 of the venturi and a second small opening 7 is located upstream of a converging portion 8 of the venturi 2. The venturi is also provided with a diverging section 9 diverging outwardly to the same extent as the section 8 diverges inwardly so that the widths of the channels upstream and downstream of the venturi 2 are of approximately the same width.

For purposes to be described subsequently, the converging portion of the nozzle 3 is similar in profile to the converging section 8 of the venturi 2.

It is necessary to operate the nozzle 3 in the choked condition; that is, with sonic flow through the throat 11. Such operation requires a pressure drop across the throat of the nozzle 3 of approximately two to one; that is, the pressure upstream is approximately twice the pressure downstream of the nozzle. If the apparatus is to be employed over a range of pressures from zero to 15 p.s.i.g., an aspirator must be employed downstream of the nozzle 3 in order to cause the nozzle to operate in the choked condition. If, on the other hand, the gauge is to be operated above pressures of 15 p.s.i.g. or 30 p.s.i.a. then the aspirator is not required. If a universal device is to be constructed, one which can operate from atmospheric or below atmospheric conditions to pressures well above twice atmospheric conditions, the aspirator is provided to permit proper operation in the lower range, below 30 p.s.i.a. The aspirator merely comprises a converging-diverging nozzle 12 terminating channel of the apparatus and a nozzle or orifice 13 connected to a source of pressurized fluid. The movement of the fluid through the nozzle 12 reduces the pressure in the region between the nozzle 3 and the nozzle 12 such that the nozzle 3 operates in the choked condition. Where the apparatus is formed as a constant depth channel in a plate, one or more nozzles or orifices 13 are brought into the channel at an angle through the bottom and perhaps top of the channel so that they do not affect the continuity of flow through the channel as would be the case in the form illustrated in FIGURE 1. The particular arrangement of FIGURE 1 would be employed in a circular device, although here also a series of angled apertures may be provided about the periphery of the channel at the location of the nozzle 13 with the angled apertures directed towards the narrowest portion of the nozzle 12.

It has been found that an apparatus of the type illustrated in FIGURE 1 provides a ratio of pressures at the holes 4 and 7 which is equal to a constant; that is, $\Delta P/P_a$ is equal to a constant. Thus $P_a$, that is, absolute pressure, is equal to a constant times the measured differential in pressure $\Delta P$ and the absolute pressure is a linear function of the measured quantity.

The lack of temperature dependence of the apparatus of the present invention can be proven mathematically by the following analysis: The mass flows through the venturi 2 and the nozzle 3 are equal inasmuch as the two elements appear in series in a continuous channel. The amount of fluid which bleeds through the pin holes 4 and 7 is so small as to have an inconsequential effect on the apparatus. The mass flow through a venturi is expressed by the following equation:

$$\dot{M}_v = C_v A_v \sqrt{\rho \Delta P} \quad (1)$$

where $C_v$ is equal to the venturi discharge coefficient, $A_v$ is the area of the venturi, $\rho_v$ is the air density at the venturi, $\Delta P$ is equal to $P_a - P_v$. $P_a$ is the atmospheric pressure, i. e., the pressure to be measured, and $P_v$ is the pressure in the throat of the venturi.

The quantity $\rho_v$ is dependent on several factors as indicated in the following equation:

$$\rho_v = \frac{P_v}{gRT} = \frac{P_a - \Delta P}{gRT} \quad (2)$$

where $g$ is equal to local acceleration of gravity, R is the perfect gas consonant and T is absolute temperature.

Substituting Equation 2 in equation 1, the mass flow equation for the venturi is:

$$\dot{M}_v = C_v A_v \sqrt{\left(\frac{P_a - \Delta P}{gRT}\right) \Delta P} \quad (3)$$

Mass flow through a choked nozzle is expressed by the following equation:

$$\dot{M}_N = C_N A_N (P_a - K_e \Delta P) \sqrt{\frac{K\left(\frac{2}{K+1}\right)^{\frac{K+1}{K-1}}}{gRT}} \quad (4)$$

where $C_N$ is the nozzle discharge coefficient, $A_N$ is the nozzle area, $K_e$ is the venturi loss coefficient and K is equal to $C_p/C_v$ which is the specific heat ratio.

Since the mass flow through the venturi 2 and through the nozzle 3 is the same, Equations 3 and 4 may be equated and are as follows:

$$C_N A_N (P_a - K_e \Delta P) \sqrt{\frac{K\left(\frac{2}{K+1}\right)^{\frac{K+1}{K-1}}}{gRT}} = C_v A_v \sqrt{\left(\frac{P_a - \Delta P}{gRT}\right) \Delta P} \quad (5)$$

by collecting terms and rearranging, Equation 6 is obtained.

$$\frac{(P_a - K_e \Delta P)^2}{(P_a - \Delta P) \Delta P} = \frac{C_v^2 A_v^2}{C_N^2 A_N^2 K \left(\frac{2}{K+1}\right)^{\frac{K+1}{K-1}}} \quad (6)$$

It will be noted that Equation 6 does not contain an absolute temperature term and therefore the apparatus is independent of absolute temperature as a first order effect. The quantities $C_v$ and $C_N$ are Reynolds number dependent.

However, the dependency is slight and the dependency of the factors $C_v$ and $C_N$ have similar variations with Reynolds number. Therefore, since the terms appear as a ratio to the same exponent in the Equation 6, even without attempting to maxmize this factor, the dependency on Reynolds number of the overall device is slight. This dependency can be decreased to an exceedingly small value by constructing, as indicated above, the approach section 8 of the venturi and the converging portion of the nozzle 3 with substantially similar profiles.

The factors $A_v$ and $A_N$ are, as indicated above, the areas of the venturi and nozzle, respectively, and since the material from which the two are fabricated is the same, any temperature changes produce substantially the same effect at both the venturi and nozzle 3. Again, these terms appear as a ratio in Equation 6 and the effects substantially cancel. The only other factor on the right side of Equation 6 that may be considered temperature dependent is the factor K, the specific heat ratio. All that is required to keep this factor constant with temperature is that the temperature of the fluid in the venturi be the same as the temperature of the fluid in the nozzle. This requirement is obviously quite easily met due to the proximity of the two in the closed flow path.

If, in Equation 6, the righthand side of the equation is made equal to a constant C, then Equation 6 takes the form of Equation 7 below:

$$\frac{(P_a - K_e \Delta P)^2}{(P_a - \Delta P) \Delta P} = C \quad (7)$$

The only term in Equation 7 which varies other than in accordance with the absolute pressure to be measured is the factor $K_e$, the venturi loss coefficient. This loss coefficient does vary slightly with Reynolds number, although over the extended operating range of the device, the Reynolds number versus loss coefficient curve is quite flat. As an example of the orders of magnitude of change involved, if the velocity of flow through the venturi changes by a factor of 10 to 1, there may be a one-half percent change in the factor $K_e$. Thus, all terms of Equation 7 are quite insensitive to changes in not only temperature, but velocity of the fluid.

By rearranging Equation 7 and multiplying by the factor $(1/P_a)^2$ Equation 8 immediately below is obtained.

$$(K_e^2 + C)\left(\frac{\Delta P}{P_a}\right)^2 - (2K_e + C)\left(\frac{\Delta P}{P_a}\right) + 1 = 0 \quad (8)$$

Using the quadratic formula, the solution to Equation 8 is represented by Equation 9.

$$\frac{\Delta P}{P_a} = \frac{2K_e + C \pm \sqrt{(2K_e + C)^2 - 4(K_e^2 + C)}}{2(K_e^2 + C)} = A \quad (9)$$

An analysis of Equation 9 clearly shows that the ratio $\Delta P/P_a$ is equal to a constant that is substantially independent of temperature and other variable factors of the system. Further, the system is linear; that is, if one is attempting to find $P_a$, the equation becomes $P_a = \Delta P/A$. Thus, the objects of the invention have been achieved.

In order to design a specific device, one may take as the start point the ratio of the areas of the venturi throat and the choked nozzle throat. Also, one may choose a value of A (Equation 9) which through general knowledge of the field is believed to be practical. In a specific device built for test purposes, an area ratio of 1 was chosen, i.e., $A_v/A_N=1$. Choosing values of $K_e=0.15$, $C_N=0.60$ and $C_v=0.98$, these values being approximations based on the overall configurations of the venturi and nozzle 3, the value of A is found to be approximately 0.21.

The fact that an actual device conforms to the theoretical analysis presented above is proven by test data upon which the graph of FIGURE 2 of the accompanying drawings is based.

Referring specifically to FIGURE 2 of the accompanying drawings, the absolute pressure $P_a$ is plotted as a function of the pressure difference between openings 4 and 7, $\Delta P$. Both quantities are in inches of mercury. The dots enclosed by small circles indicate test data points and the horizontal line B is the approximate pressure at which choked flow occurs disregarding the pressure drop across the venturi.

A straight line D fitted to the test points has a slope of 0.228 which is quite close to the estimated value. It will be noted that only a single test point, indicated by letter E, deviates to any appreciable extent from the line D. This point lies quite close to the line B and since the exact pressure at which the nozzle 3 becomes choked lies slightly above the line B it may well be that the point E lies in a pressure range at which choking of the nozzle 11 has not fully occurred.

Once the exact value of the constant A of Equation 9 is known, in the case above being 0.228, the apparatus may thereafter be employed to measure absolute pressures. Specifically, the $\Delta P$ measuerment may be divided by 0.228 or conversely multiplied by approximately 4.38.

The differential in pressure as between the taps 4 and 7 may be measured by a standard or differential pressure gauges, manometers, or the two taps may be applied as inputs to the opposite control nozzles of a pure fluid analog amplifier of the geenral type disclosed in Horton Patent No. 3,122,165. Alternatively, if it is desired to convert the readings to a digital form, the pressure taps 4 and 7 may be connected each to the nozzle of a different pressure controlled oscillator. In this case, the difference in frequencies between the two oscillators provides an indication of absolute pressure. In either of the latter two cases cited immediately above, the measuring apparatus is completely compatible with integrated pure fluid circuits and systems.

As indicated, the apparatus is operable so long as the pressure difference thereacross is sufficient to produce choked flow through the nozzle but is insufficient to produce choked flow in the venturi. The desired pressure difference may be at least partially achieved by establishing at least a partial vacuum at the egress end of the apparatus, as in operation in space.

While I have described and illustrated one specific embodiment of my invention, it will be clear that variation of the details of construction which are specifically illustrated and described may be resorted to without departing from the true spirit and scope of the invention.

I claim:

1. A device for utilization in measuring absolute pressures over a predetermined range of absolute pressures comprising a continuous flow channel in which substantially the same quantity of fluid egresses from one end thereof as is supplied to the other end thereof, said fluid channel having a venturi formed therein and a nozzle formed therein downstream of said venturi, said predetermined range of absolute pressures being determined at least in part by the relative sizes and shapes of said venturi and said nozzle such that upon application of an absolute pressure to be measured lying in said predetermined range of absolute pressures to said other end of said channel, fluid flows through said nozzle at sonic velocity and fluid flows through said venturi at below sonic velocity, means for sensing static pressure upstream of said venturi and means for sensing static pressure at a point of maximum fluid flow velocity through said venturi.

2. A device for utilization in measuring absolute pressures over a predetermined range of absolute pressures comprising a continuous flow channel having an ingress end and an egress end and in which substantially the same quantity of fluid flows through both said ends, said flow channel having a venturi formed therein and a nozzle formed therein downstream of said venturi, said predetermined range of absolute pressures being determined at least in part by the relative sizes and shapes of said venturi and said nozzle such that upon application of an absolute pressure lying in said predetermined range of absolute pressures at said ingress end, fluid flows through said nozzle at sonic velocity and fluid flows through said venturi at below sonic velocity, means for sensing static pressure upstream of said venturi and means for sensing static pressure at a point of maximum fluid flow velocity through said venturi.

3. A device for utilization in measuring absolute pressures over a predetermined range of absolute pressures comprising a continuous flow channel in which substantially the same quantity of fluid egresses from one end thereof and is applied to the other end thereof, said flow channel having a venturi formed therein and a nozzle formed therein downstream of said venturi, said predetermined range of absolute pressures being determined at least in part by the relative sizes and shapes of said venturi and said nozzle such that upon application of a pressure to be measured to said other end of said channel which is greater than the pressure at said one end of said channel by an amount which falls within said predetermined range of pressures, fluid flows through said nozzle at sonic velocity and fluid flows through said venturi at below sonic velocity, means for sensing static pressure upstream of said venturi and means for sensing static pressure at a point of maximum fluid flow velocity through said venturi.

4. A device for utilization in measuring absolute pressures over a predetermined range of absolute pressures comprising a continuous flow channel having an ingress end and egress end in which substantially the same quantity of fluid flows through both said ends, said flow channel having a venturi formed therein and a nozzle formed therein downstream of said venturi, means for providing a pressure at said egress end of said channel such that for given relative sizes and shapes of said venturi and said nozzle application of a pressure lying in said predetermined range of said absolute pressures at said ingress end of said channel causes fluid to flow through said nozzle at sonic velocity and causes fluid to flow through said venturi at below sonic velocity, and means for measuring the differential in pressure between the static pressure at said ingress end of said channel and the minimum static pressure in said venturi, whereby said differential in pressures a measure of the absolute pressure at the ingress end of said channel.

5. The combination according to claim 4 wherein both said venturi and said nozzle have converging sections of similar profile.

6. The combination according to claim 4 wherein said means for providing a pressure comprises an aspirator connected in said channel downstream of said nozzle.

7. The method of determining absolute pressure lying within a specified range of absolute pressures comprising applying an absolute pressure to be measured to a one end of a venturi and a nozzle connected in series flow relation and establishing a pressure at the other end of said venturi and nozzle connected in series flow relation such that fluid flows first through the venturi at below sonic velocity and then the same fluid in substantially the same quantity flows through the nozzle at sonic velocity, measuring the pressure differential between the upstream portion of the venturi and the throat of the venturi as a function of said absolute pressure.

8. The method of determining a differential in pressure related to an absolute pressure to be measured by the equation $P_a = K\Delta P$ where K is a constant, $P_a$ is absolute pressure and $\Delta P$ is a differential pressure to be determined, the method comprising the steps of applying said absolute pressure to be measured to one end of a venturi and a nozzle connected in series flow relation and establishing a pressure at the other end of said venturi and nozzle connected in series flow relation such that fluid flows first through the venturi at below sonic velocity and then the same fluid in substantially the same quantity flows through the nozzle at sonic velocity, measuring said differential pressure to be determined as the difference between the pressure upstream of the venturi and the pressure at the throat of the venturi.

References Cited

UNITED STATES PATENTS

| | | | |
|---|---|---|---|
| 1,641,295 | 9/1927 | Schroeder | 73—213 |
| 1,940,921 | 12/1933 | Smith | 73—213 |

LOUIS R. PRINCE, *Primary Examiner.*

D. O. WOODIEL, *Assistant Examiner.*

U.S. Cl. X.R.

73—205, 213